(12) United States Patent
Riegel

(10) Patent No.: US 10,158,580 B2
(45) Date of Patent: *Dec. 18, 2018

(54) UTILIZING ACCESS CONTROL DATA STRUCTURES FOR SHARING COMPUTING RESOURCES

(71) Applicant: Red Hat, Inc., Raleigh, NC (US)

(72) Inventor: Torvald Riegel, Dresden (DE)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,885

(22) Filed: Dec. 6, 2017

(65) Prior Publication Data

US 2018/0109466 A1  Apr. 19, 2018

Related U.S. Application Data

(63) Continuation of application No. 14/552,741, filed on Nov. 25, 2014, now Pat. No. 9,853,908.

(51) Int. Cl.
*G06F 9/46* (2006.01)
*H04L 12/911* (2013.01)
*G06F 21/60* (2013.01)

(52) U.S. Cl.
CPC ............ *H04L 47/70* (2013.01); *G06F 9/46* (2013.01); *G06F 21/604* (2013.01)

(58) Field of Classification Search
None
See application file for complete search history.

(56) References Cited

U.S. PATENT DOCUMENTS

| | | |
|---|---|---|
| 7,117,481 B1 | 10/2006 | Agesen |
| 7,210,105 B2 | 4/2007 | Melamed et al. |
| 7,783,649 B2 | 8/2010 | Molnar et al. |
| 7,788,314 B2 | 8/2010 | Holt |
| 8,127,303 B2 | 2/2012 | Kukanov et al. |
| 8,301,700 B1 | 10/2012 | Havemorse |
| 8,341,643 B2 | 12/2012 | Fulton et al. |
| 2006/0112377 A1 | 5/2006 | Nacul |
| 2007/0271450 A1 | 11/2007 | Doshi et al. |
| 2011/0126204 A1 | 5/2011 | Omara |
| 2014/0089930 A1 | 3/2014 | Hartmann |

OTHER PUBLICATIONS

Allen B. Downey, "The Little Book of Semaphores", Jun. 1, 2005, 291 pages, http://greenteapress.com/semaphores/downey08semaphores.pdf.
Ulrich Drepper, Futexes Are Tricky; Nov. 5, 2011, 12 pages, http://www.akkadia.org/drepper/futex.pdf.
Ion Gaztanaga; Simplifying and Extending Mutex and Scoped Lock Types for C++ Multi-Threading Library, Jun. 18, 2006; 12 pages; http://www.open-std.org/Jtc1/sc22/wg21/docs/papers/2006/n2043.html.
Russell, et al. "A Futex Overview and Update [LWN.net]"; Nov. 11, 2009, 3 pages; http://lwn.net/Articles/360699/.

*Primary Examiner* — Wissam Rashid
(74) *Attorney, Agent, or Firm* — Lowenstein Sandler LLP

(57) ABSTRACT

Systems and methods for sharing resources between multiple processing streams. An example method may comprise: maintaining, by a processing device, a first variable indicating a number of processing streams waiting to access a resource; performing an operation on a second variable comprising a first portion and a second portion, the operation comprising updating the first portion to reflect a number of available units of the resource and further comprising reading the second portion reflecting a value of the first variable.

20 Claims, 4 Drawing Sheets

UTILIZING ACCESS CONTROL DATA STRUCTURES FOR SHARING COMPUTING RESOURCES

RELATED APPLICATIONS

This application is a continuation of application Ser. No. 14/552,741, filed Nov. 25, 2014, entitled "Utilizing Access Control Data Structures for Sharing Computing Resources," which is incorporated herein by reference herein.

TECHNICAL FIELD

The present disclosure is generally related to computer systems, and is more specifically related to controlling access to computing resources.

BACKGROUND

Many computing systems support multiple threads executing concurrently to perform tasks in parallel. During execution, the threads may require access to shared resources to perform certain functions. To handle contention between the threads, the computing systems may use semaphore data structures, which may coordinate the threads' access to the shared resources. The semaphore data structure may enable a thread to wait (e.g., sleep) for a resource while another thread is occupying the resource. Once the resource becomes available, the semaphore data structure may awaken the thread and provide the thread access to the resource.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1A:
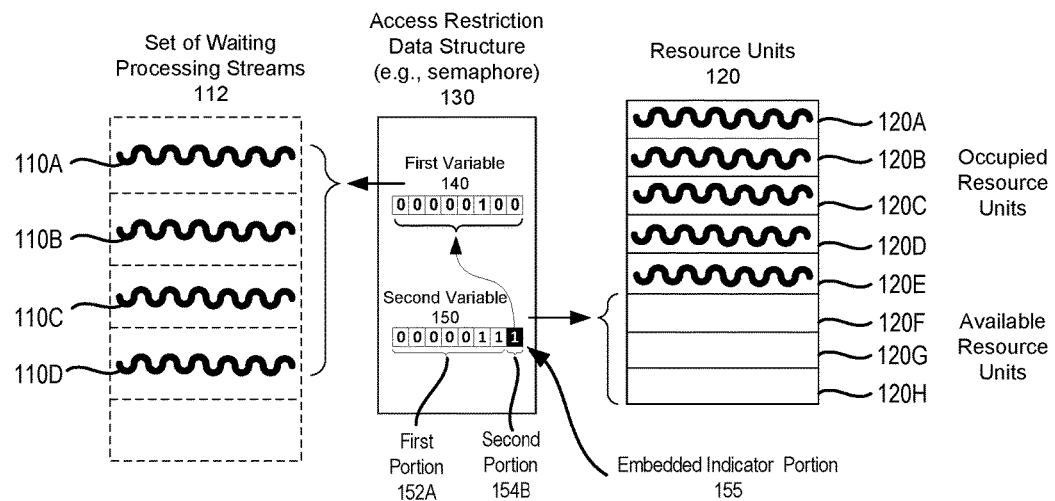
FIG. 1 depicts a high-level diagram of one illustrative embodiment of an access control data structure in accordance with one or more aspects of the present disclosure.

Described herein are methods and systems for utilizing an access control data structure to share resource units between multiple processing streams (e.g., threads, processes). the access control structure may have a first variable that indicates the number of processing streams waiting to access a resource and a second variable that indicates the number of available units of the resource. The first and second variables may be interrelated, for example, when a resource becomes available a processing stream that has been waiting may be awoken and provided access to the resource, which may result in a modification of both variables.

Modifying multiple interrelated variables may be accomplished using atomic operations. The quantity of data that can be accessed in an atomic operation may depend on the hardware architecture. For example, a computer system having a 64-bit architecture may be able to access multiple 32 bit variables atomically. However, if the computer system has a 32-bit architecture it may not be able to access multiple 32-bit variables in a single atomic operation. In the latter situation, each variable may be accessed with a separate operation, which introduces a risk that a processing stream may access the first variable and be interrupted before the processing stream can access the second variable. During the interruption, the variables may change which may lead to an inconsistent state and unpredictable behavior.

In one example, the second variable may also include an embedded indicator portion (e.g., true/false bit) that indicates whether the first variable has a non-zero value. This may allow the system to utilize an atomic operation to access a single variable (i.e., the second variable) to determine the value of multiple variables (e.g., first and second variables). The first and second variable may each be 32 bits and the computing system may support 32 bit atomic operations. The first variable may utilize all 32 bits to represent an integer value and the second variable may be segmented into two portions. The first portion may be a majority of the bits (e.g., 31 bits) and represent an integer value and the second portion (e.g., embedded indicator portion) may be a single bit representing a binary value (e.g., true/false). By accessing the second variable, the computing system may determine both the number of available resources and whether there are any waiting resources in a single atomic operation.

Various aspects of the above referenced methods and systems are described in details herein below by way of examples, rather than by way of limitation.

FIG. 1 is an illustration representing an access control data structure in accordance with aspects of the disclosure. FIG. 1 includes processing streams 110A-D, resource units 120A-H and access control data structure 130. Access control data structure 130 may comprise a first variable 140 and a second variable 150. The second variable 150 may have a first portion 152 and a second portion 154, wherein the second portion comprises an embedded indicator portion 155.

Processing streams 110-D may comprise streams that execute programmed instructions and may be managed by an operating system (e.g., scheduler). The processing streams 110A-D may be executed concurrently by a computing device that supports multiple processing units. The multiple processing units may be from multiple processors or from a single processor with multicore cores or a combination of both. In one example, processing streams 110A-D may be a computing thread, such as a system thread, user thread or fiber. In another example, the processing streams 110A-D may comprise computing processes, such as system processes, user processes or background processes (e.g., daemons) wherein a computing process may comprise one or more computing threads.

Each of the processing streams 110A-D may comprise a thread control block, one or more counters (e.g., program counters) and a state (e.g., running, ready, waiting, start, done). The thread control block may be an operating system manifestation of the processing stream and may comprise a plurality of thread register values and a stack pointer that may point to a computing thread stack of a computing process.

Resource Units 120A-H may comprise units of a physical or virtual resources that are internal or external to a computing device. A physical resource may be any resource associated with a tangible component, such as a piece of hardware, whereas virtual resources may include logical or abstract representations of physical resources. Virtual resources may include files (e.g., file handles), network connections (e.g., network sockets, bandwidth), processing time, logical memory (e.g., virtual memory), virtual machine resources (e.g., Java Virtual Machine (JVM)), or other similar resources. Internal resources may comprise internal system components, such as memory (e.g., main memory, L1-3 Cache), processing devices (e.g., processors, cores), storage space (e.g., hard disc), network adapter (e.g., WiFi Card, Ethernet card) and other similar tangible resources. External resources may include system resources that are external to the computing device, such as for example, peripheral devices (e.g., external hard drives, display devices or input/output devices).

Each of the resource units 120A-H may be similar to one another, such that a processing unit 110A-D may use any of the resource units 120A-H to complete a computing task. The units may all be associated with the same physical component or may spread across multiple separate and independent physical components (e.g., separate memory modules).

Access control data structure 130 is a data structure that may be utilized by a computing system to manage access of processing streams 110A-D to a group of shared resource units 120A-H. Access control data structure 130 may include one or more variables, such as first variable 140 and second variable 150, which may be accessed directly or indirectly by processing streams 110A-D. Variables 140 and 150 may be used to coordinate when processing streams 110A-D can access resource units 120A-H. In one example, access control data structure 130 may comprise a semaphore data type that may be used to manage consumption of a shared resource by one or more processing streams.

First variable 140 may be used to track or indicate the number of processing streams 110A-D that are waiting to access the resource units 120A-H. In one example, first variable 140 may be a numeric value (e.g., integer, decimal), which may be stored in a binary form. As shown in FIG. 1A, first variable 140 has a binary value of 0x00000100, which represents an integer value of 4 and may correspond to the 4 processing streams in waiting set 112.

Second variable 150 may be used to indicate and track the number of available resource units. Available resource units are resource units that are not currently being utilized (e.g., consumed), such as resource units 120C and 120F which are not utilized by any processing streams. Second variable 150 may comprise multiple portions, including a first portion 152 that may comprise a value (e.g., integer, decimal) corresponding to the number of available resource units and a second portion 154 (e.g., embedded indicator portion 155) that may be reflective of a value of the first variable.

Embedded indicator portion 155 may be included within second variable 150 and may indicate the value of another variable (e.g., first variable 140). The embedded indicator portion 155 may indicate the value of another variable by comprising one or more bits that can represent an abbreviated value of the other variable. The abbreviated value may be a true or false value that indicates whether the other variable fulfills a condition, such as, whether the other variable is zero. In one example, the embedded indicator portion may comprise a single bit, wherein a binary value of "1" represents true and a binary value "0" represents false, or vice versa. The bit may correspond to a condition of whether the first variable evaluates to zero or may correspond to a condition of whether the first variable evaluates to non-zero.

Each of the portions 152 and 154 of the second variable may comprise a different number of bits and evaluate to different values. As shown in FIG. 1A, second variable 150 has two portions, first portion 152 comprises the left most 7 bits and has a binary value of 0x0000011 and second portion 154 comprises the least significant bit (e.g., last bit) with a binary value of 0x1. When evaluated as a whole, the second variable may evaluate to a numeric value of 7, however, when evaluating the portions separately, the first portion evaluates to a numeric value of 3, which may represent the number of available resource units (e.g., 120F-H) and the second portion (e.g., embedded indicator portion 155) evaluates to "true," which may indicate the first variable 140 has a non-zero value. In other examples, the embedded indicator portion 155 may comprise more than one bit, for example, it may be a nibble (4 bits), a byte (8 bits) or some other fraction of the word length (e.g., 32 bit or 64 bit) of the computer architecture. The embedded indicator portion 155 may evaluate to a true/false value or another value, such as an integer, decimal or other value.

Embedded indicator portion 155 may be defined in a variety of locations within the second variable. As seen above the embedded indicator portion 155 comprises the least significant bit (e.g., last bit) of second variable 150. However, in other examples, embedded indicator portion 155 may comprise the first bit of second variable 150 or may be a bit somewhere in the middle of the bits allocated to the second variable 150. When the embedded indicator portion comprises multiple bits they may be consecutive bits or may be spread across any available bit positions.

In other examples, there may be multiple embedded indicator portions 155 within a single variable (e.g., second variable 150). Each embedded indicator portions may represent a separate variable or may represent multiple conditions of one variable or a combination of both.

Figure 1B:
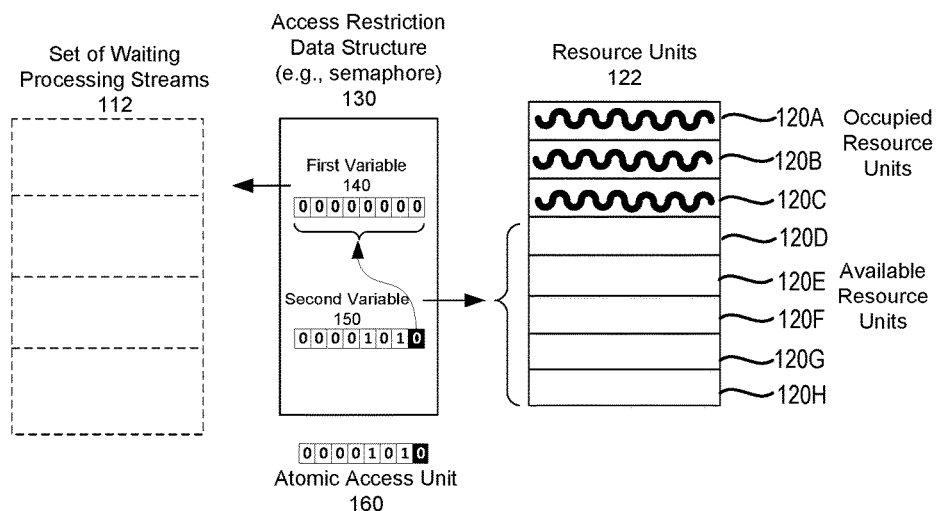

FIG. 1B illustrates an example where the embedded indicator portion 155 indicates that there are no waiting processing streams. In this illustration, waiting set 112 is empty and as such first variable 140 has a binary value of 0x00000000, which may represent that the set of waiting processing streams 112 is empty and thus has a value of zero. First portion 152 of second variable 150 may contain the binary value 0x0000101, which may indicates there are 5 available resource units (i.e., 120D-H). The embedded indicator portion 155 comprises the binary value 0x0, which represents that the statement "the first variable is non-zero" evaluates to "false."

FIG. 1B also includes atomic access unit 160, which represents the quantity of data that can be accessed in an atomic operation. An atomic operation may be executed or initiated by a processing stream and may be isolated from being interrupted. An advantage of an atomic operation is that it avoids the risk that a processing stream accessing multiple variables may be interrupted before it can read or modify both variables, for example, a processing stream may read one variable and then be interrupted for a duration of time, at which point another processing stream may modify the second variable and when the processing stream is re-started it may read the second variable which may no longer be in sync with the value of the first variable read before the interruption.

The atomic access unit may be smaller than the combination of both the first and second variable and as such the atomic access unit may not be able to access data of both variables in a single atomic operation. The atomic access unit 160 may have a size greater than or equal to the size of a single variable. As shown in FIG. 1B, the first and second variables 140 and 150 and atomic access unit 160 are shown to be 8 bits and the atomic access unit 160 includes a copy of the information contained within second variable 150 (e.g., 0x00001010). The use of 8 bit structures is for ease of illustration, in an implementation they may be any quantity, such as 32 bits, 64 bits or any other larger or smaller number of bits.

The quantity of bits of atomic access unit 160 may relate to the architecture of the computing system and may correspond to a combination of the hardware capabilities and the software capabilities. In one example, there may be a 32-bit software platform being executed by a 32-bit hardware architecture in which case first variable 140, second variables 150 and atomic access unit 160 may be 32 bits. In another example, there may be a 32-bit software platform being executed by a 64-bit hardware architecture in which case first variable 140, second variables 150 and atomic access unit 160 may be 32 bits.

One advantage of having second variable 150 comprise embedded indicator portion 155 is that with a single atomic operation a processing stream may access second variable 150 to determine the number of available resources (e.g., first portion 152) and whether the value of the first variable is zero (e.g., embedded indicator portion 155).

In one example, second variable 150 may be implemented using a semaphore data structure. The semaphore data structure may include multiple operations (e.g., functions or methods) that may be called by processing streams 110A-D and may enable the processing stream to wait (e.g., sleep) for a resource to become available. The operations may include a WAIT operation and a POST operation. The WAIT operation may be called by a processing stream to provide the processing stream with access to an available unit of the resource or may cause the processing stream to wait (e.g., sleep) when a unit of the resource is not available. When the resource is not available the WAIT call may increment first variable 140 and update embedded indicator portion 155 to indicate there is a processing stream in waiting set 112. Once a processing stream begins waiting it may continue to wait until a notification, such as a WAKE-UP signal, is received. A WAKE-UP signal may be initiated by another processing stream when the other processing makes a POST call.

The POST call may signify that a processing stream has finished with a unit of the resource and that the processing stream is releasing its lock on the resource. The POST call may involve incrementing second variable 150 to indicate a resource unit is available. The POST call may also initiate a WAKE-UP signal to wake up a waiting processing stream so that it can access the available resource.

In another example, second variable 150 may be implemented using futex operations and data structures. A futex is a "Fast Userspace Mutex" and may be a kernel data structure that may be accessible to processing streams via system calls. A futex may be associated with a kernel space wait set (e.g., queue) that is associated with an integer in user space (e.g., second variable 150). Multiple processing streams may modify the second variable 150 in user space using atomic operations to avoid interfering with one another. The futex operations may be similar to the WAIT and POST operations discussed above with respect to semaphore operations. However, futex operations may only resort to system calls to request operations on the wait set, for example, to wake up waiting processes or to put the current process on the wait set. A futex-based lock may avoid system calls until a lock is in contention, such as when there are more processing streams attempting to access the resource then there are available resource units 120A-H. In one example, the futex data structure may store second variable 150 and the value of the second variable 150 may be used to determine whether a processing stream can be provided access the resource or whether the processing stream should begin waiting.

Figure 2:
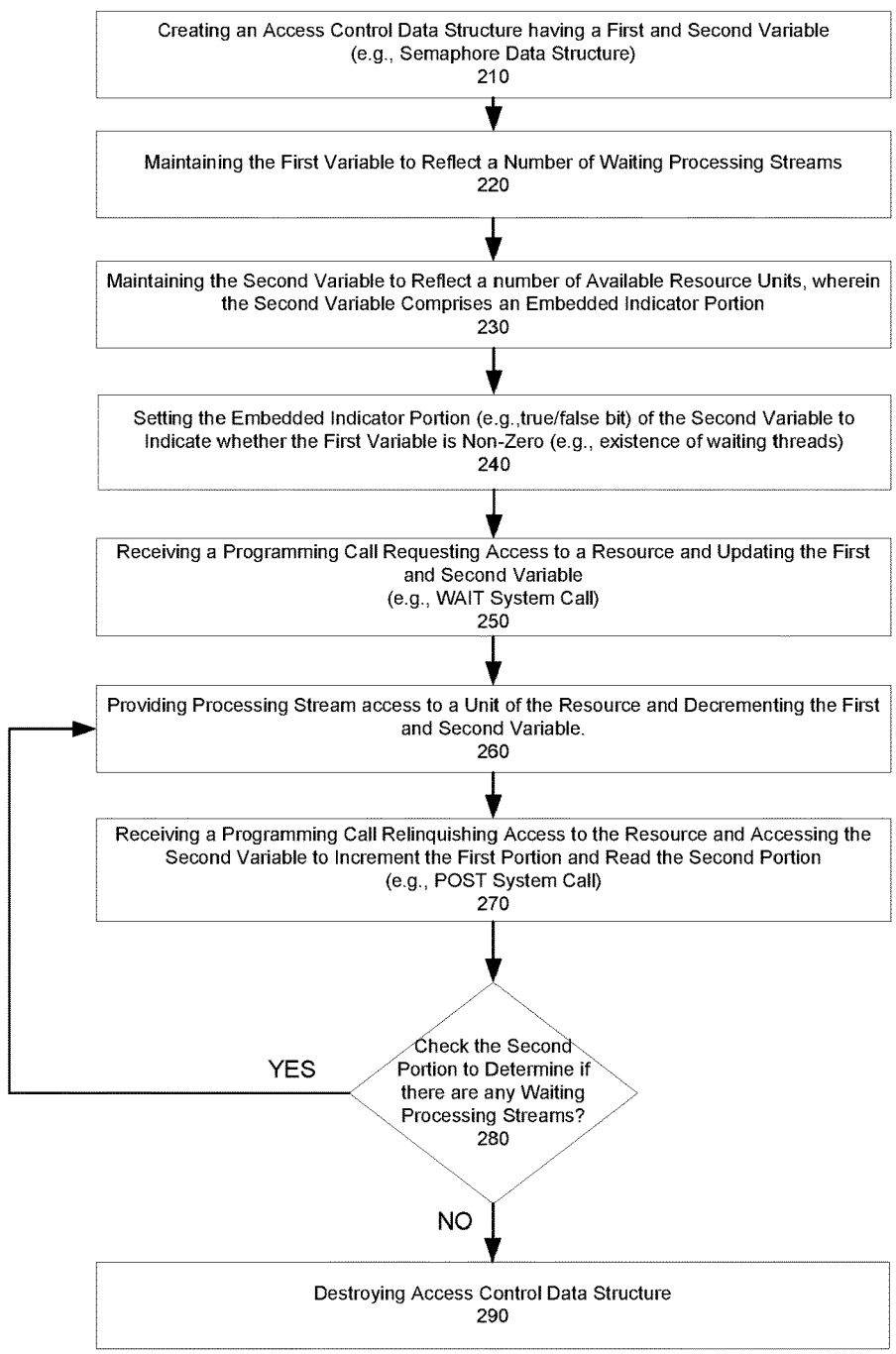
FIG. 2 depicts a flow diagram of an example method for sharing computing resources using an access control data structure in accordance with one or more aspects of the present disclosure.

FIG. 2 depicts a flow diagram of one illustrative example of a method 200 for utilizing access control data structure 130 to share resource units 120A-H between processing streams 110A-D. Method 200 and each of its individual functions, routines, subroutines, or operations may be performed by one or more processors of the computer device executing the method. In certain implementations, method 200 may be performed by a single processing stream.

At block 210, the computing device performing the method may create an access control data structure 130 having a first variable 140 and a second variable 150. In one example this may be a semaphore data structure implemented using futexes.

At block 220, the computing device may maintain the first variable 140 to reflect the number of processing streams in waiting set 112 and at block 230 the computing device may maintain the second variable 150 to reflect a number of available resource units. Maintaining a variable may comprise storing, updating, setting, assigning, incrementing, decrementing or modifying a variable to keep its value consistent with a state of a computing devices processing streams or resources. Maintaining second variable 150 may involve maintaining an embedded indicator portion 155. As shown by block 240, this may comprise the computing device setting the embedded indicator portion 155 of the second variable to indicate whether first variable 140 is non-zero (e.g., existence of waiting threads).

At block 250, the computing device may make a programming call requesting access to a resource, which may update first variable 140 and second variable 150 (e.g., embedded indicator portion 155). The programming call may be a WAIT call that causes the computing device to increment the first variable 140 and to set embedded indicator portion of second variable 150 to true. In one example, the programming call may utilize the Portable Operating System Interface (POSIX). POSIX may be a standard that helps define the application programing interface (API) of an operating system to enhance compatibility between different operating systems (e.g., Linux and Unix).

At block 260, the computing device may provide the processing stream access to a unit of the resource. The processing stream may then utilize (e.g., consume, occupy) the resource unit to complete one or more tasks. Once the processing stream has completed the task associated with the resource it may proceed to block 270.

At block 270, the computing device may make a programing call to relinquish access to the resource unit, which may result in an access to second variable 150 to increment the first portion and read the second portion. This may be implemented using a release resource programming call, such as a POST programming call. The POST programming call may identify one or more resources to be released and may proceed to block 280.

At block 280, the computing device may check the second portion of the second variable 150 to determine whether there are any waiting processing stream. When there are waiting streams the method may branch to block 260 to provide access to the resource. When there are no waiting processing streams it may proceed to block 290

At block 290, the computing device may destroy the access control data structure 130. Destroying the access control data structure may comprise freeing the space allocated to access control data structure 130 or flagging the data structure for subsequent processing (e.g., memory reallocation). Responsive to completing the operations described herein above with references to block 218, the method may terminate.

Figure 3:
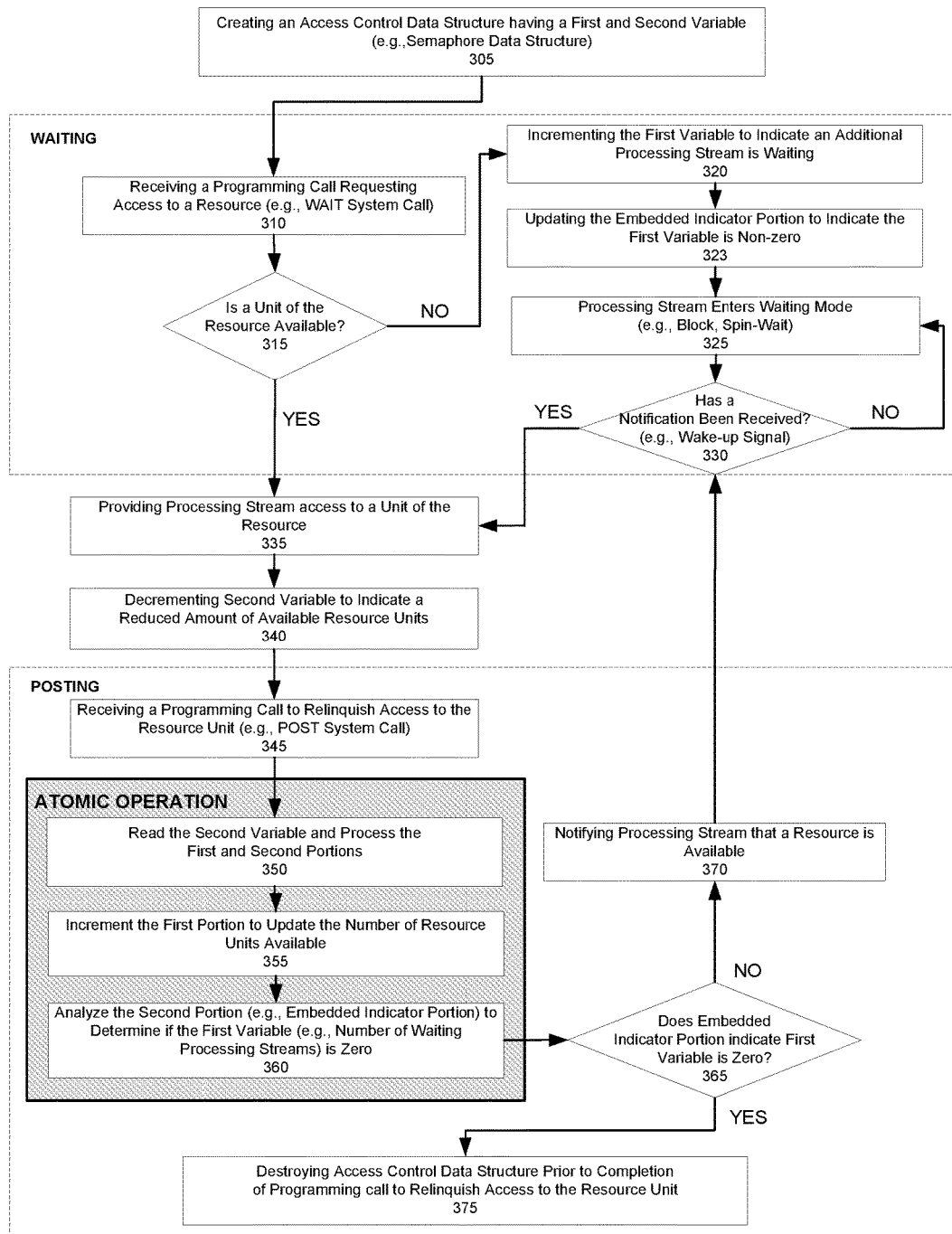
FIG. 3 depicts another flow diagram of an example method for sharing computing resources using an access control data structure in accordance with one or more aspects of the present disclosure.

FIG. 3 depicts a flow diagram of one illustrative example of a method 300 for utilizing access control data structure 130 in cooperation with atomic operations to share resource units 120A-H amongst processing streams 110A-D. Method 300 includes a more detailed discussion of block 250 (e.g., WAIT call) and block 270 (e.g., POST call). Each of the individual functions, routines, subroutines, or operations may be performed by one or more processors of the computer device executing the method. In certain implementations, method 300 may be performed by multiple processing streams.

At block 305, the computing device performing the method may create an access control data structure 130 having a first variable 140 and a second variable 150. In one example this may be a semaphore data structure implemented using futex data structures and accessed using futex operations.

At block 310, the computing device may receive a programming call requesting access to a resource. As discussed above, this may comprise a WAIT call, at which point the computing device may analyze whether there is a resource unit 120 available as shown at block 315. When a resource unit is available, the method may proceed to branch 335 and when a resource unit is not available, it may branch to block 320

At block 320, the computing device may increment the first variable to indicate an additional processing stream is waiting and at block 323 the computing device may update the embedded indicator portion 155 of second variable 150 to reflect that first variable 140 is non-zero. These operations may occur in any order or concurrently, in one example, the first variable may be updated first and then the embedded indicator portion may be updated next. In another example, the embedded indicator portion may be updated first and then the first variable may be updated next.

In one example, the computing device may update the embedded indicator portion 155 with a conservative value that approximates the number of waiting streams without accessing the first variable to determine the exact number of waiting streams. The conservative value may address an issue, which may arise when the computing device cannot update embedded indicator portion 155 and access first variable 140 in an atomic operation (e.g., both values may not fit in an atomic access unit). The conservative value may be determined using a heuristic algorithm that hypothesizes whether the first variable is non-zero. The heuristic algorithm may generate a conservative value that may favor a value (e.g., true/false) that indicates the first variable is non-zero. By favoring a value that indicates there are waiting processing streams (e.g., non-zero) an incorrect conservative value may merely result in a spurious wakeup, whereas an incorrect zero value may result in a processing stream not being woken up correctly. A spurious wakeup may occur when a processing stream transitions to a waiting state awaiting a change to a resource but is woken up before a modification is made to the resource. This may occur, for example, when a processing stream begins waiting after a wakeup signal is initiated but before the wakeup signal is processed. The processing stream may not need to be woken up since it began waiting after the signal was initiated. However, depending on how the wakeup operation is implemented, the processing stream may be woken up because processing the signal may awaken all the processing streams that are waiting and not just those that began waiting before the signal was initiated. The existence of spurious wakeups may allow the wakeup implementation to be less complex.

In one example, the heuristic algorithm may utilize one or more of the following factors to derive a conservative value: the duration of time that has elapsed since the first variable was last read, the quantity of waiting threads, total number of resource units, current ratio between waiting threads and resource units and how often processing streams are provided access to the resource.

When the computing device discovers the conservative value of the embedded indicator portion is incorrect (e.g., periodic check), it may execute a clean-up procedure and update the embedded indicator portion to accurately reflect whether there are waiting processing streams. The clean-up procedure may comprise waking one or more waiting processing streams and having them re-analyze their wait condition to refresh waiting set 112. In one example, this may include one or more processing streams being woken up to check for a lock or attempt to access a resource or combination of resources. When the resources are unavailable the processing stream may re-enter the waiting state. As a result, the waiting set of processing streams will be refreshed and the embedded indicator portion may be updated in view of the refreshed waiting set.

At block 325, the computing device may cause the processing stream to enter a waiting mode, such as a blocked state or spin-wait. A blocked state may comprise a processing stream setting an internal or external data structure member to signify the thread is going to discontinue executing until it is notified or until a predetermined duration of time expires. A spin-wait comprises a technique in which the processing stream repeatedly checks to see if a condition evaluates to true (e.g., is lock available). In one example, the processing stream may utilize the futex operations discussed above to enter or exit the waiting mode.

At block 330, the computing device may check to determine if a notification has been received. The notification may comprise a wakeup signal sent by the computing device when a processing stream releases a resource unit. The wakeup signal may inform one or more waiting processing streams that a resource unit may be available. In response to the notification, the processing stream may evaluate the wait condition (e.g., has memory been modified) or attempt to access the resource. When the resource is available it may proceed to block 335, which may be similar to block 260 of FIG. 2.

At block 335, the computing device may allow the processing stream to utilize the resource unit and may proceed to block 340 to decrement second variable 150 to indicate a reduced amount of available resource units . The processing stream may continue to utilize (e.g., consume, occupy) the resource unit until the processing stream is preempted or voluntarily releases the resource unit. Preempting may be initiated by the computing device (e.g., scheduler) and may result in the processing stream being interrupted during the execution of a task. The processing stream may be preempted with the intent of resuming the task at a later time. A processing stream may voluntarily release the resource by making a programing call to release the resource unit, which may occur when the resource has completed a task or the processing stream has determined it cannot complete its task at this time (e.g., needs access to another resource as well).

At block 345, the computing device may receive a programing call to relinquish or release access to a resource unit. This may be implemented using a programming call, such as a POST programming call. The POST programming call may identify one or more resources to be released and may process some or all of its steps atomically. As shown in FIG. 2 blocks 350, 355 and 360 may be performed as an atomic operation.

At block 350, the computing device may read second variable 150 and process first portion 152 and second portion 154. The processing of second variable 150 may comprise one or more bitwise operations to separate a variable having multiple bits into multiple separate portions. The portions may be separated using a bitmask, which may identify the quantity and location of bits associated with each separate portion. The first portion may comprise a majority of the bits (e.g., 31 of the 32 bits) and the second portion may only include a minority of the bits (e.g., 1, 2 bits). Processing second variable 150 may also comprise processing each portion to access (e.g., read, evaluate) or modify (e.g., update, increment, decrement) the value. The bitwise operations may operate on the portions simultaneously or may operate on the first portion and second portion separately (e.g., serially, consecutively). By separating the portions, the bit operations may read or modify the bit patterns at the level of their individual bits as opposed to the value they represent as a whole. The bitwise operations may include one or more bitwise operators such as AND, OR, XOR or bit shifts such as arithmetic shifts, logical shifts or any other similar bitwise operations.

At block 355, the computing device may increment first portion 152 of second variable 150 to reflect the increased number of available resource units. This may involve reading the first portion of the second variable to determine its value (e.g., integer, decimal) and then increasing the value by the number of resource units being released. For example, when the processing stream is releasing a single resource unit the first portion may be incremented a single unit however when multiple resource units are being released it may be incremented by a quantity equal to the number of resource units being released.

At block 360, the computing device may analyze second portion 154 to determine the value of the embedded indicator portion 155. At block 365, the computing device may check whether the embedded indicator indicates the first variable is zero. If the first variable is not zero the method may proceed to block 370 and notify one or more processing streams in waiting set 112 that a resource unit is available and branch to decision block 330. In one example, block 370 may involve making a WAKE-UP call, as discussed above, to unblock a processing stream. On the other hand, if the embedded indicator portion 155 indicates the first variable is zero, the method may proceed to block 375.

At block 375, the computing device may destroy access restriction data structure 130. As shown in FIG. 3, the destruction of the access restriction data structure 130 may occur during the programming call releasing the resources. More specifically, the destruction may occur during the execution of the POST call or prior to the completion of the POST call.

Responsive to completing the operations described herein above with references to block 375, the method may terminate.

Figure 4:
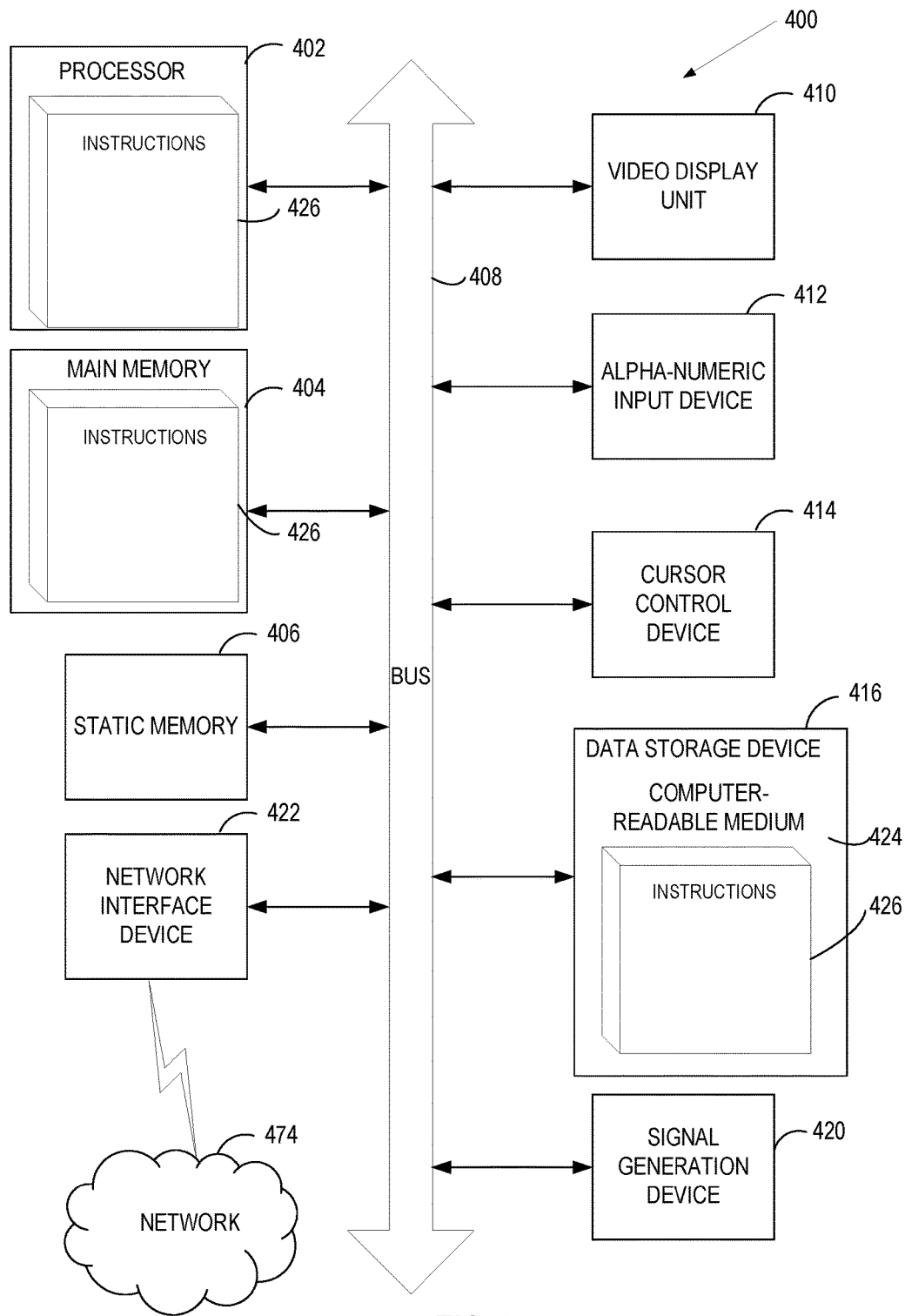
FIG. 4 depicts a block diagram of a computer system operating in accordance with one or more aspects of the present disclosure.

FIG. 4 depicts a block diagram of a computer system operating in accordance with one or more aspects of the present disclosure. In various illustrative examples, computer system 400 may correspond to example system 100 of FIG. 1.

In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processor 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processor 402 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 also may include a video display unit 410 (e.g., an LCD), an alphanumeric input device 412 (e.g., a keyboard), and a cursor control device 414 (e.g., a mouse).

Data storage device 416 may include a non-transitory computer-readable storage medium 424 on which may store instructions 426 encoding any one or more of the methods or functions described herein, including instructions encoding access control data structure 999 of FIG. 1 implementing method 300 for controlling access to shared resources.

Instructions 426 may also reside, completely or partially, within main memory 404 and/or within processor 402 during execution thereof by computer system 400, hence, main memory 404 and processor 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   maintaining, by a processing device, a first variable indicating a number of processing streams waiting to access a resource;
   performing an operation on a second variable comprising a first portion and a second portion, the operation comprising updating the first portion to reflect a number of available units of the resource and further comprising reading the second portion reflecting a value of the first variable.

2. The method of claim 1, wherein the second portion of the second variable comprises an embedded indicator portion reflecting the value of the first variable is non-zero.

3. The method of claim 1, wherein the processing streams comprise at least one of a thread or a process.

4. The method of claim 1, wherein the first variable and the second variable are part of an access control data structure associated with the resource.

5. The method of claim 1, wherein the first variable and the second variable comprise a combined size that is larger than an atomic access unit of the operation.

6. The method of claim 2, wherein the embedded indicator portion comprises a single bit of the second variable.

7. The method of claim 1, wherein the operation is initiated by a POSIX POST call that makes a unit of the resource available for consumption.

8. The method of claim 4, wherein the access control data structure is a semaphore data structure.

9. The method of claim 8, further comprises destroying the semaphore data structure prior to a completion of a POST call that updates the second variable of the semaphore data structure.

10. The method of claim 1 further comprising:
    updating the first variable to increase the number of processing streams waiting to access the resource; and
    setting the second portion of the second variable to indicate the first variable is not zero.

11. A system comprising:
    a memory; and
    a processing device communicably coupled to the memory, the processing device to execute instructions to:
      maintain a first variable indicating a number of processing streams waiting to access a resource;
      perform an operation on a second variable comprising a first portion and a second portion, the operation comprising updating the first portion to reflect a number of available units of the resource and further comprising reading the second portion reflecting a value of the first variable.

12. The system of claim 11, wherein the second portion of the second variable comprises an embedded indicator portion reflecting the value of the first variable is non-zero.

13. The system of claim 11, wherein the processing streams comprise at least one of a thread or a process.

14. The system of claim 11, wherein the first variable and the second variable are part of an access control data structure associated with the resource.

15. The system of claim 11, wherein a combined size of the first variable and the second variable is larger than an atomic access unit of the operation.

16. The system of claim 11, wherein the operation is initiated by a POSIX POST call that makes a unit of the resource available for consumption.

17. The system of claim 14, wherein the access control data structure is a semaphore data structure.

18. The system of claim 17, wherein the processing device further to destroy the semaphore data structure prior to a completion of a POST call that updated the second variable of the semaphore data structure.

19. The system of claim 11, wherein the processing device further to:
    update the first variable to increase the number of processing streams waiting to access the resource; and
    set the second portion of the second variable to indicate the first variable is not zero.

20. A non-transitory machine-readable storage medium storing instructions which, when executed, cause a processing device to execute operations comprising:

maintain a first variable indicating a number of processing streams waiting to access a resource;
perform an operation on a second variable comprising a first portion and a second portion, the operation comprising updating the first portion to reflect a number of available units of the resource and further comprising reading the second portion reflecting a value of the first variable.

* * * * *